Sept. 7, 1937.     B. G. LA BAR     2,092,044
TERMINAL CLAMP
Filed Jan. 16, 1936
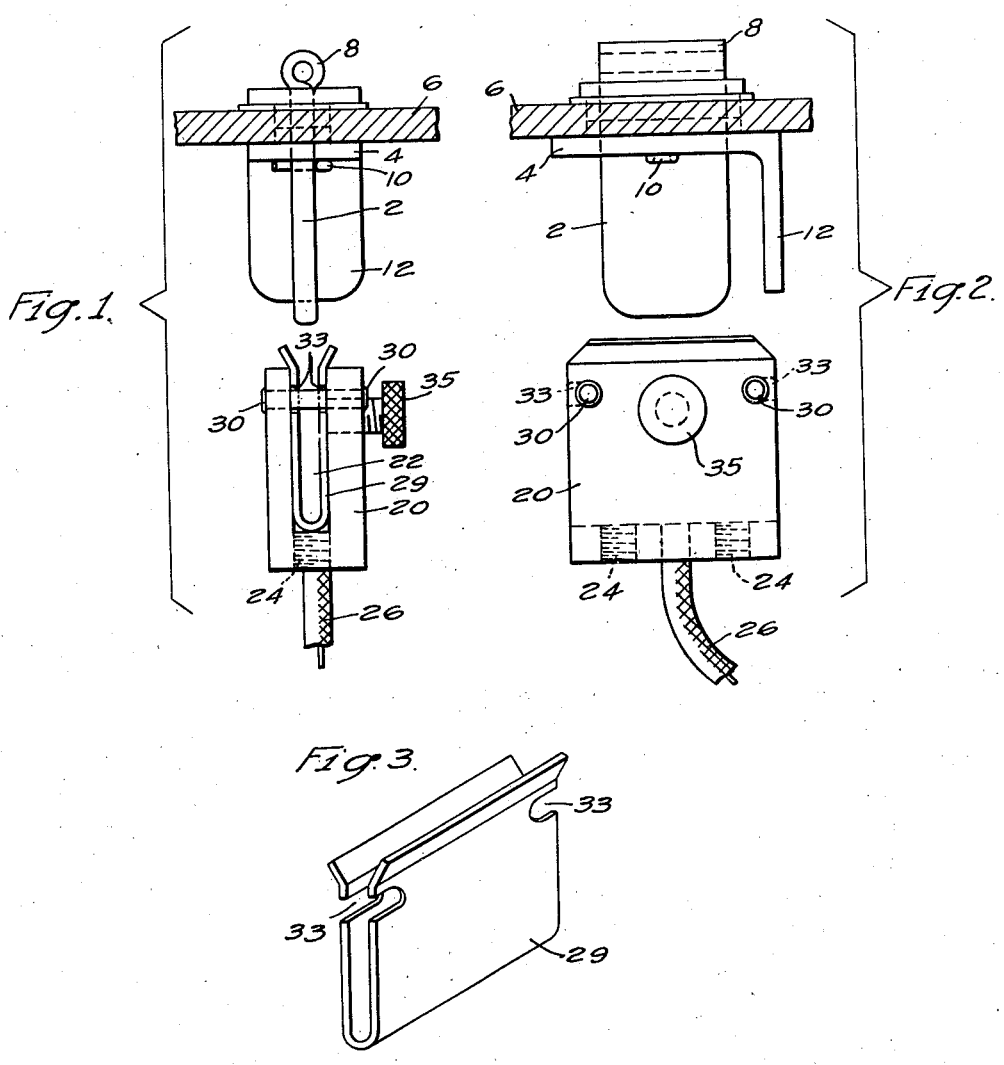
WITNESSES:
INVENTOR
Bert G. La Bar,
BY
ATTORNEY Patented Sept. 7, 1937

2,092,044

UNITED STATES PATENT OFFICE 2,092,044

TERMINAL CLAMP

Bert G. La Bar, Union, N. J., assignor to Westinghouse Electric & Manufacturing Company, East Pittsburgh, Pa., a corporation of Pennsylvania Application January 16, 1936, Serial No. 59,404

1 Claim. (Cl. 173—328)

The present invention relates to terminal clamps and particularly to a clamp adapted to receive the terminal blade of a watthour meter of the detachable type.

In the detachable type of watthour meter, as shown for example in Patent 1,969,499, issued August 7, 1934 to Bradshaw et al., four contact blades usually project from the rear of the meter casing for cooperation with contact jaws in a receptacle on which the meter casing is removably secured. It is common practice to test meters of this character by means of a jack inserted between the meter casing and the receptacle; the jack having contact jaws to receive the meter blades and contact blades to be received in the jaws in the receptacle. By this arrangement suitable leads may be taken from the jack to the testing equipment. In the testing of a meter, it is, of course, essential that the circuits from the testing equipment to and through the meter shall have a minimum contact resistance and, since the electrical connection between the meter contact blades and the corresponding jaws on the test jack is a frictional one, variations in resistance at these points may have an undesirable effect upon the accuracy of the testing operation. Also, it is essential that a positive mechanical mounting of the meter on the test jack is obtained, to maintain the meter in operative position during the testing operation.

Accordingly, it is an object of the present invention to provide a contact jaw or terminal clamp for receiving the blade of a watthour meter in a manner to insure a positive electrical and mechanical connection therebetween in an efficient manner. Although the invention is described and shown with specific reference to the blade of a watthour meter, it obviously may be used in many other relations where contact members of the telescopic type are encountered.

Referring to the drawing,

Figure 1 is a view in end elevation of a terminal clamp in accordance with the present invention showing also partly in section a type of contact blade for which the clamp is particularly adapted.

Fig. 2 is a view in front elevation of the elements shown in Fig. 1, and

Fig. 3 is a perspective view of an element of the terminal clamp in accordance with the present invention.

Referring to Figs. 1 and 2, the type of contact blade with which the invention may be used comprises a blade 2 of conducting material extending through a suitable bushing 4 in the base 6 of a watthour meter, terminating in a loop 8 within the meter casing for receiving a lead from the meter element which may be suitably soldered therein. In accordance with usual practice, the blade is maintained in operative position by a cotter pin 10 extending through an aperture in the blade just below the bushing 4. Also, the bushing 4 usually includes a portion 12 extending along the blade 2 to insulate the blade from the surrounding metal parts of the base or receptacle upon which the meter is to be mounted.

The type of terminal clamp for receiving the blade 2 is shown in the lower portions of Figs. 1 and 2. The clamp comprises a member 20, substantially of U-shape in end elevation, defining a slot 22 of a width greater than the thickness of the blade 2. The member 20 is provided in its base with a pair of threaded apertures 24 to receive the ends of screws or other suitable devices extending through the base of the test jack or other support. Also the member 20 is provided in the base thereof with an aperture for receiving the end of a lead 26, such end being soldered or otherwise suitably secured in said aperture.

A sheet member 29 of substantially U-shape in end elevation, as shown more clearly in Fig. 3, is proportioned to fit into the slot in the member 20 and to be retained therein by rivets 30 secured to the member 20 adjacent the ends of the slot 22 in a position to extend through notches 33 in said sheet member 29.

The sheet member 29 constitutes an insert or liner for the member 20 and is so proportioned that it resiliently engages a contact blade 2 inserted therein; the free lateral edges of the member 29 being flared outwardly a slight amount to facilitate the insertion of the blade into the terminal. The member 29 may be of any resilient sheet material, such as phosphor bronze, and although it is positively retained in the member 20, it is somewhat loosely disposed therein by reason of the cooperation of rivets 30 with the notches 33 to permit some adjustment in the position thereof when the blade is inserted.

One side of the member 20 is somewhat heavier than the other for receiving a knurled thumb screw 35 which extends through said side into engagement with the resilient liner 29. By this means when the contact blade 2 is inserted in the clamp, the screw 35 may be forced against the side of the resilient liner to obtain a positive electrical and mechanical contact between the blade 2 and the liner to eliminate, as far as is practical, any variations in contact resistance between the blade and the terminal clamp assembly.

The terminal clamp constructed in accordance with the foregoing description is unusually rugged, and both electrically and mechanically efficient.

Quite obviously many modifications may be made in the construction shown and described without departing from the scope of the invention. It is desired, therefore, that only such limitations be imposed on the invention as are shown in the prior art and set forth in the appended claim.

I claim as my invention:

A terminal for receiving a contact blade comprising a member of substantially rigid construction having a slot of greater width than the thickness of said blade, a liner of resilient material in said slot for resiliently receiving said blade, means extending through said rigid member and loosely engaging said liner for securing the latter in operative position comprising a pair of pins each secured to said rigid member and disposed adjacent to the ends of said slot extending through notches formed in the edges of said liner.

BERT G. LA BAR.